United States Patent
Coon

(10) Patent No.: US 6,493,190 B1
(45) Date of Patent: Dec. 10, 2002

(54) TRACE FLEXURE WITH CONTROLLED IMPEDANCE

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 3 days.

(21) Appl. No.: 09/656,908

(22) Filed: Sep. 7, 2000

Related U.S. Application Data

(60) Provisional application No. 60/226,054, filed on Aug. 16, 2000.

(51) Int. Cl.[7] .................................................. G11B 5/48
(52) U.S. Cl. .................................. 360/245.9; 360/264.2
(58) Field of Search ........................... 360/245.9, 244.1, 360/245.8, 246, 264.2

(56) References Cited

U.S. PATENT DOCUMENTS

| | | | | |
|---|---|---|---|---|
| 5,805,382 A | * | 9/1998 | Lee et al. .................... 360/123 |
| 5,862,015 A | * | 1/1999 | Evans et al. .............. 360/245.9 |
| 5,959,808 A | * | 9/1999 | Fan et al. ................. 360/245.9 |
| 5,986,853 A | * | 11/1999 | Simmons et al. ......... 360/97.01 |
| 5,995,328 A | * | 11/1999 | Balakrishnan ........... 360/245.9 |
| 6,038,102 A | * | 3/2000 | Balakrishnan ........... 360/245.9 |
| 6,146,813 A | * | 11/2000 | Girard et al. ................ 430/319 |
| 6,181,520 B1 | * | 1/2001 | Fukuda .................... 360/244.1 |
| 6,249,404 B1 | * | 6/2001 | Doundakov et al. ..... 360/245.4 |
| 6,275,358 B1 | * | 8/2001 | Balakrishnan et al. ... 360/264.2 |

FOREIGN PATENT DOCUMENTS

JP          7-287952        * 10/1995

* cited by examiner

*Primary Examiner*—Jefferson Evans
(74) *Attorney, Agent, or Firm*—Louis J. Bachand

(57) ABSTRACT

Impedance controlled trace flexure for a disk drive suspension comprising a laminated of a metal layer, an insulative film layer and at least one pair of conductive traces extending between spaced points on the flexure and adhered to the film layer in metal layer-spaced relation, at least one member of the pair being varied relative to the other pair member in that the length of at least one member between the spaced points is made greater than the distance between the spaced points or in width or thickness to control the impedance of the one pair member to match or not match the impedance of said the pair member.

12 Claims, 7 Drawing Sheets

TRACE FLEXURE WITH CONTROLLED IMPEDANCE

CROSS-REFERENCE TO RELATED APPLICATIONS

This application claims the benefit of U.S. Provisional Patent Application Ser. No. 60/226,054 filed Aug. 16, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to wireless suspensions in which the flexure comprises a laminate of plastic film, trace conductors, and a metal layer. In a specific aspect, the invention relates to improvements in the design and manufacture of suspension flexures to have capacitance and thus impedance values controlled separately for each trace and each pair of traces to have constant values throughout their lengths, as desired, and the same or different absolute impedance values for optimizing read and write circuit pairs, and to accommodate mechanical limitations of the flexure design, as needed for optimum flexure performance.

The invention achieves control of impedance by increasing or decreasing capacitance (to correspondingly decrease or increase impedance) of each conductive trace of a pair or pair of conductive traces through modification of trace width, and/or spacing from adjacent traces, or by changes in effective length by varying the length of a trace between defined places on the flexure, while not altering the distance between those defined places.

2. Description of the Related Art

Existing trace flexure designs have layouts that feature conductive trace paths generally as straight as possible, with any change in path direction being curved with as large as possible a radius. Generally, with multiple conductive traces routed side by side, the spacing between the traces will be at least locally uniform, that is, in any given portion of the trace flexure, the spacing between adjacent conductive traces and the trace width will not vary much. If, however, the traces after being routed alongside each other go to different destinations on the layout, such as occurs when the traces are divided to reach both sides of a slider along the outriggers.

A currently typical spacing for 0.0016 inch wide and 5 to 20 micron thick conductive traces in a wireless flexure is a 40 micron (1 micron equals 1 micrometer equals 40 micro inches) space laterally between adjacent traces. The traces thickness is determined by the flexure laminate, and is assumed to be fixed by the laminate supplier for purposes of this invention.

This width and spacing combination results in a characteristic impedance referred to as $Z_0$, for the device and for each pair of conductive traces considered. Presently used trace flexures have a characteristic impedance of 30 or so ohms.

BRIEF SUMMARY OF THE INVENTION

The putative "characteristic impedance" is not found at all points along the trace or pair of traces. Rather many variations from that impedance are found. This occurs, for example, in a disk drive suspension flexure because $Z_0$ changes with differences in trace cross section or trace spacing arising from diverging trace pairs, and changes in routing and bends in traces around mechanical features of the flexure, such as tooling holes or weld points. It is, however, desirable that the flexure have a $Z_0$ that is constant along the length of the traces and trace pairs throughout the flexure, and in the case of read-write circuits, constant at about 110 ohms for the write lines and at about 60 ohms for the read lines.

As the operating frequency of the disk drive increases, the importance of adhering to the constant and correct impedance becomes ever more important. Any change in impedance $Z_0$ causes a reflection of the signal being sent along that path; the reflection represents wasted signal and an increase in noise. Both wasted signal (lost signal strength) and increased noise effectively decrease the signal to noise ratio (SNR) and thus decrease this important measure of the quality of an electronic device.

Historically, trace flexure layouts have to the good had generally large radius curves, but also uniform trace widths and spacing, all in accordance with the design rules of printed circuit boards (PCBs), which is the preceding technology to flex circuits and wireless flexures. But, PCBs were a different animal from flexures since there device placement was at the whim of the PCB designer, and mechanical constraints, so important in flexures, were not really a factor. The PCB designer could place the devices to be connected anywhere he wanted to, constant width and spacing of conductors was a design that was both correct and easy.

In making this invention it has been recognized that the simple default design taken from PCB technology does not apply to the very different case of trace flexures in which the end points of the traces are immutably fixed by exigencies of disk drive suspension technology, and their intermediate lengths are necessarily detoured around fixed obstacles implicated in suspension design, such as tooling holes and weld points.

Time Domain Reflectometry (TDR) analysis computes $Z_0$ as a function of time as the energy passes down the trace length. TDR shows that the $Z_0$ for an apparently uniform trace varies dramatically along the length of the trace in previously known flexure design, and even the nominal value of $Z_0$ value about which the variation takes place is less than specifications require.

It is, accordingly, an object of this invention to provide a wireless flexure for a disk drive suspension having a constant characteristic impedance $Z_0$ over the length of the flexure traces regardless of the presence of mechanical obstacles, curves in layout, or other factors that have caused unwanted variations in impedance along and between conductive traces and trace pairs in the flexures. It is another object to provide an improved flexure design in which the conductive traces are customized along their length to meet situations that might limit the constancy of the impedance of the trace. It is a still further object to vary locally the width and spacing of conductive traces to offset locally unwanted variations and lack of constancy in impedance imposed by the flexure design or application. Yet another object is to increase the effective length of one or more traces to increase capacitance relative to one or more adjacent traces and thus limit inversely changes in impedance constancy. It is yet another object to vary the length and configuration of one or more traces relative to another trace or traces between fixed points to change to a desired value the impedance of the one relative to the other, e.g. to increase the impedance of a write line over that of an adjacent read line.

These and other objects of the invention to become apparent hereinafter are realized in a controlled impedance trace flexure for a disk drive suspension, the trace flexure comprising a laminate of a metal layer, an insulative film layer and one or more pairs of conductive traces comprising paired trace members that extend together differentially in a pattern between two fixed points such that there tend to be unwanted local variations in the respective impedances of the paired members over their extent and therefore a lack of constancy in conductive trace impedances, the paired members being locally modified in their relative spacing, length and/or width in capacitance-varying relation sufficiently to offset the impedance variations, whereby the paired members are controlled to a constant impedance.

In this and like embodiments, typically, the paired members at a predetermined locus tend to unwanted variations in their respective impedances, and the paired members are locally differentiated in width at the predetermined locus to locally vary their capacitance against the impedance variations, or the paired members are locally differently spaced at the predetermined locus to locally vary their capacitance against the impedance variations.

Alternatively, the paired members are made locally of different effective lengths within the predetermined locus to locally vary their capacitance against the unwanted impedance variations.

In a further embodiment, the invention provides a controlled impedance trace flexure for a disk drive suspension, the trace flexure comprising a laminate of a metal layer, an insulative film layer and one or more pairs of conductive traces comprising paired trace members that extend together over a predetermined distance between two fixed points and in which there tends to be at a given locus an unwanted local variation in the impedances of the respective paired members, one of the paired members being reversely turned within the given locus to increase its effective length relative to the other paired member in capacitance-increasing relation sufficiently to make uniform the impedance of the one conductive trace with the other conductive trace, whereby the paired members are kept at a uniform impedance within the locus.

In this and like embodiments, typically, the one paired member is sinuous within the locus and has a predetermined period from peak to peak, the predetermined period being smaller than the frequency of the signals carried by the one paired member, e.g., the signal frequency is about 1 GHz, and the paired member period is less than about 1 inch.

In a further embodiment, the invention provides a controlled impedance trace flexure for a disk drive suspension, the trace flexure comprising a laminate of a metal layer, an insulative film layer and one or more pairs of conductive traces comprising paired trace members that extend together over a predetermined distance between two fixed points and in which there tends to be an unwanted variation between the total impedances of the respective paired members, one of the paired members being reversely turned within the predetermined distance to increase its effective length relative to the other paired member in capacitance-increasing relation sufficiently to make uniform the impedance of the one conductive trace with the other conductive trace, whereby the paired members are kept at a uniform impedance.

In this and like embodiments, the one paired member is sinuous and has a predetermined period from peak to peak, the predetermined period being smaller than the frequency of the signals carried by the one paired member, e.g., the signal frequency is about 1 GHz, and the paired member period is less than about 1 inch.

In a further embodiment, the invention provides a controlled impedance trace flexure having two or more pairs of conductive traces comprising members that extend together over a predetermined distance between two fixed points, one pair of conductive trace members being reversely turned within the predetermined distance to increase its effective length relative to the other pair in capacitance-increasing relation relative to the other pair, whereby the one pair has a relatively higher impedance desired in a write circuit and the other pair has a relatively lower impedance desired in a read circuit.

In this and like embodiments, the one pair has an impedance of about 110 ohms, and the other pair has an impedance of about 60 ohms.

In addition, there can be provided in this and like embodiments, a further conductive trace disposed between the pairs of conductive traces, the further conductive trace being connected to electrical ground, whereby one the pair is electrically isolated from the other pair.

In yet another embodiment, the invention provides a controlled impedance trace flexure for a disk drive suspension having two or more pairs of conductive traces each comprising paired members that extend together differentially in a pattern over a predetermined distance between two fixed points such that there tend to be unwanted local variations in the respective impedances of the paired members over their extent, the paired members being locally modified in their length through a sinuous shaping of the members within the predetermined distance sufficiently to offset the impedance variations, whereby the paired members of the pair of conductive traces are controlled to a constant impedance with each other.

In this and like embodiments, typically, the one paired member is sinuous within the locus and has a predetermined period from peak to peak, the predetermined period being smaller than the frequency of the signals carried by the one paired member, the signal frequency being about 1 GHz, and the paired member period being less than about 1 inch, and there optionally being a further conductive trace disposed between the pairs of conductive traces, the further conductive trace being connected to electrical ground, whereby one the pair is electrically isolated from the other pair.

In a still further embodiment, the invention provides a controlled impedance trace flexure for a disk drive suspension, the trace flexure comprising a laminate of a metal layer, an insulative film layer and two or more pairs of conductive traces each comprising paired members that extend together over a predetermined distance between two fixed points, the pairs of conductive traces being differentially sinuous to have different effective lengths over the predetermined distance, whereby the conductive trace pairs have different impedances from one another.

In this and like embodiments, typically, each paired member within the pairs is parallel with the other member in the pair, each sinuous pair has a predetermined period from peak to peak, the predetermined period being smaller than the frequency of the signals carried by the one pairs, and typically a signal frequency of about 1 GHz, and a period of the pairs that is less than about 1 inch.

Additionally, there can be provided a further conductive trace disposed between the pairs of conductive traces, the further conductive trace being connected to electrical ground, whereby one pair is electrically isolated from the other pair.

In its method aspects, the invention provides a method of controlling impedance in a conductive trace flexure comprising a laminate of a metal layer, an insulative film layer and one or more pairs of conductive traces that are differentially routed over their lengths, including varying the width, spacing, and/or effective length of one of the conductive traces relative to the other conductive trace until the desired impedance is achieved.

A further invention method includes controlling impedance in a conductive trace flexure comprising a laminate of a metal layer, an insulative film layer and pairs of generally parallel, spaced conductive traces that are to have different impedances over their lengths, by making the higher impedance trace sinuous over at least a portion of its length to increase its effective length and its impedance thereby.

A further invention method includes controlling impedance in a conductive trace flexure comprising a laminate of a metal layer, an insulative film layer and multiple pairs of generally parallel, spaced conductive traces in which certain pairs are to have higher impedances over their lengths, by making the higher impedance pairs sinuous over at least a portion of their lengths to increase their effective length and make their impedance higher thereby.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
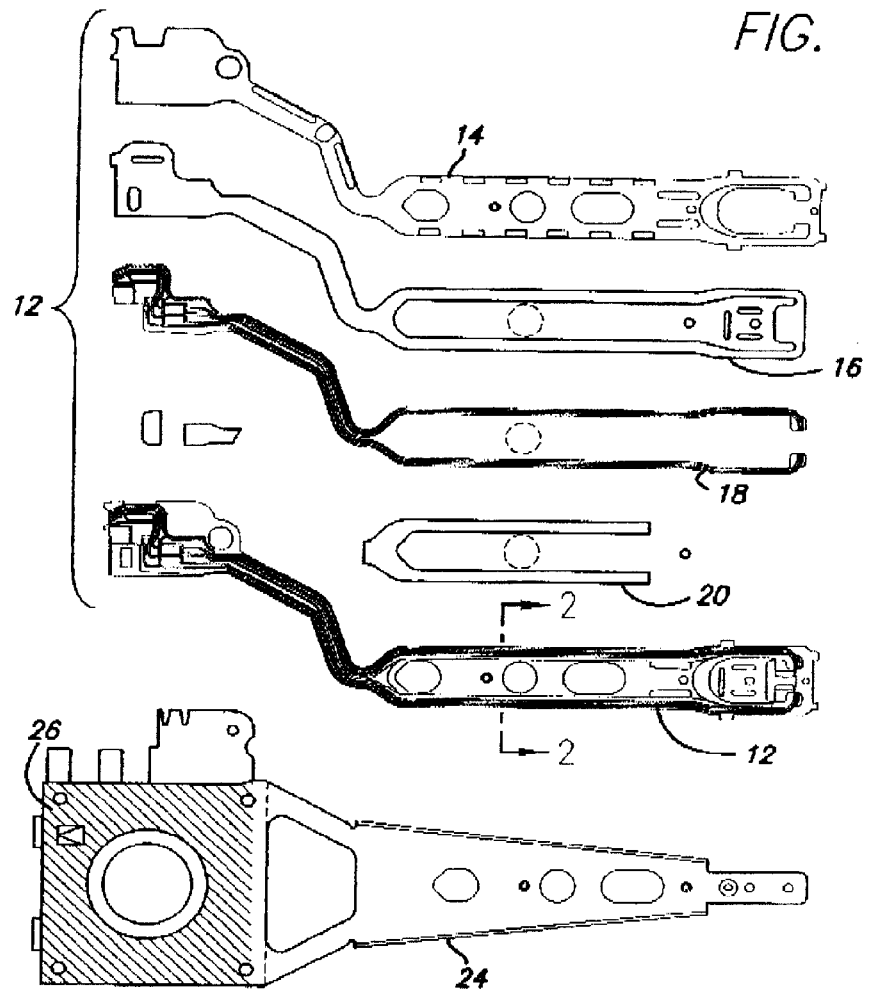
FIG. 1 is an exploded view of the invention flexure and load beam combination.

Impedance control in accordance with the invention involves specifically tailoring of the conductive traces singly or in pairs or pairs of pairs along their entire length or along a segment of that length by one or more particular means to adjust to or from a reference value the capacitance of the trace(s) to achieve constancy in $Z_0$, and to thereby provide each increment of the trace flexure a $Z_0$ that is by design of the proper value.

In one aspect of the invention, impedance control is achieved by adjusting the trace width and spacing between adjacent traces so that the capacitance is varied as needed to be constant along the length of the trace. Since impedance $Z=(L/C)^2$, increasing the capacitance C can lower Z when desired, and conversely, decreasing capacitance C can increase Z.

In another aspect of the invention, the effective length of the trace is changed by a sinuous disposition of the trace on the insulative film layer. Thus, serrating or snaking the traces effectively increases the length of the trace between any two given points, and the capacitance changes, sufficiently to accomplish the purposes of the invention. Capacitance herein refers to capacitance per unit length, or total capacitance, of the device as will be clear from the context In general, the several embodiments of the invention include increasing capacitance to ground from one trace of a pair without affecting the other paired trace. This enables the obtaining of the same total capacitance for each trace of the device even though the path from end to end, being sinuous, might be longer for the one trace than for the other trace. This approach is superior to routing the one trace in a loop or on some other circuitous path because in the invention only the one trace is involved; the capacitance to the other trace is maintained the same. In the sinuous trace, the period of the layout (the distance between wave peaks, shown as "p", should be small relative to the wavelength of the frequency carried by the trace in order to minimize reflections. One should have many small waves rather than a few long ones. For a frequency of 1 GHz, the highest frequency being contemplated at this time, the period or wavelength of the electrical signal is about 0.3 meters or about 12 inches, so the period of the trace peaks should be much less than 12 inches, preferably less than one inch, and suitably the period p is about 0.020 inch.

The invention impedance control technique can be used to change the relative impedance of adjacent trace pairs, as is desirable in certain read-write devices where the read circuit preferably has a lower impedance such as 60 ohms, and the write circuit a higher impedance of about 110 ohms.

The impedance change of one trace only of two or more pairs of traces can be effected under the invention by making the affected trace only in each pair sinuous or otherwise effective longer. This will be desirable where mechanical layout concerns dictate that there be an increased length to one trace of the pair and the impedance change resulting needs to be offset.

Additionally, pairs of traces can be varied in impedance rather than just one trace of one pair where, for example, it is desired to have a different impedance in one pair of traces than in a second pair of traces the first pair can be sinuous and the second pair not.

In any of the invention embodiment, the traces can be better isolated from one another by adding a grounded trace between the traces to be relatively isolated.

In addition to the effective length changes discussed next above, the impedance in localized areas of individual traces can be varied to offset unwanted variations in impedance imposed by the layout by changes in width of the trace along the affected portion of the trace only, or changes in spacing to counteract layout imposed changes and achieve a constant impedance overall. In the situation of a curvilinear routing around an obstacle that results in the outer trace on the curve having a longer path than the inner trace while the traces are parallel through the turn, a small change in width or relative spacing can be used to offset the resulting increased capacitance decreased impedance in the one trace to make impedance constant in the pair despite the curve.

In the various manners indicated herein the impedance can be adjusted by selective capacitance changes to suit the electrical requirements of the circuit.

With reference now to the drawings in detail, in FIG. 1 a typical suspension is shown at 10. The suspension 10 comprises a flexure 12 comprising a laminate of metal layer 14, an insulative film layer 16, copper traces 18, and a cover layer 20 of plastic film. The flexure 12 is attached at several points (not shown) to a load beam 24. Load beam 24 is provided with base plate 26 for attachment to an actuator arm (not shown).

Figure 2:
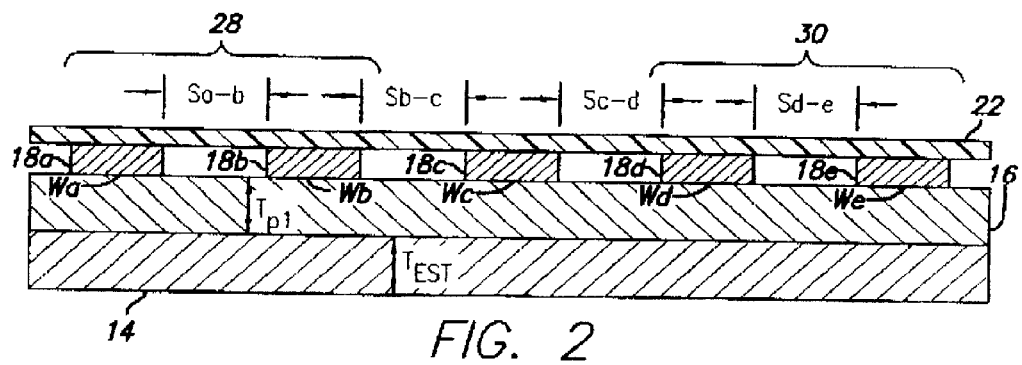
FIG. 2 is a view taken on line 2—2 in FIG. 1.

Thusfar described the suspension 10 is conventional. With reference to FIG. 2, the traces 18a, 18b, 18c, 18d and 18e are shown in their alignment on the insulative film layer 16 and the metal layer 14. Traces 18a and 18b form a circuit comprising one pair 28 of traces; traces 18d and 18e form a circuit comprising a second pair of traces 30. Trace 18c is a grounded trace as will be described hereinafter. All traces 18a–e have a given height, a variable width Wa-e, and a variable relative lateral spacing from one another: Sa-b, Sb-c, Sc-d, or Sd-e.

Figure 8:
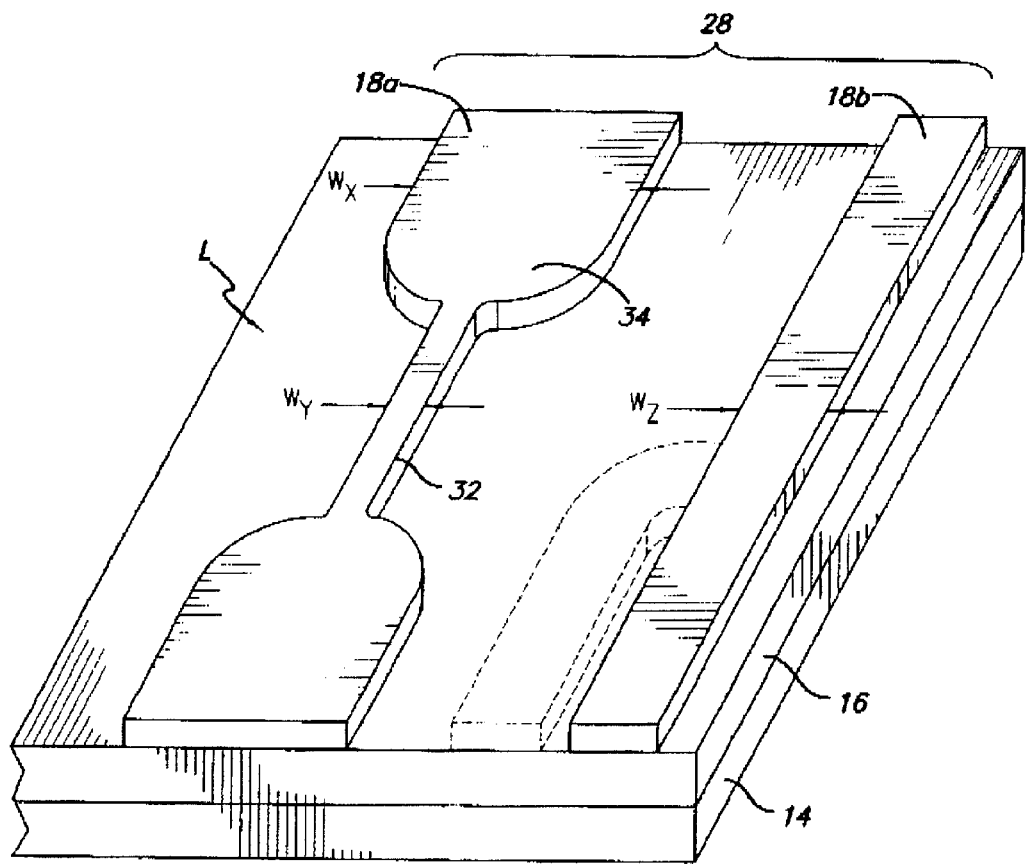
FIG. 8 is a view like FIG. 3 of a further embodiment of the invention.

As noted above, and with reference to FIG. 8, in the design and manufacture of trace flexures 12 certain paired traces, e.g., 18a, 18b can at a given locus L tend to have unwanted variations in their respective impedances. To counter this, the paired members 18a and 18b are locally differentiated in width e.g. at 32 and 34 within the predetermined locus L to locally vary their capacitance against the impedance variations. Alternatively, paired members 18a, 18b are locally differently spaced within the predetermined locus L to locally vary their capacitance against the impedance variations. See the dotted lines in FIG. 8.

With reference to FIGS. 3–6, paired conductive trace members are made locally of different effective lengths within the predetermined locus L to locally vary their capacitance against the unwanted impedance variations.

Figure 3:
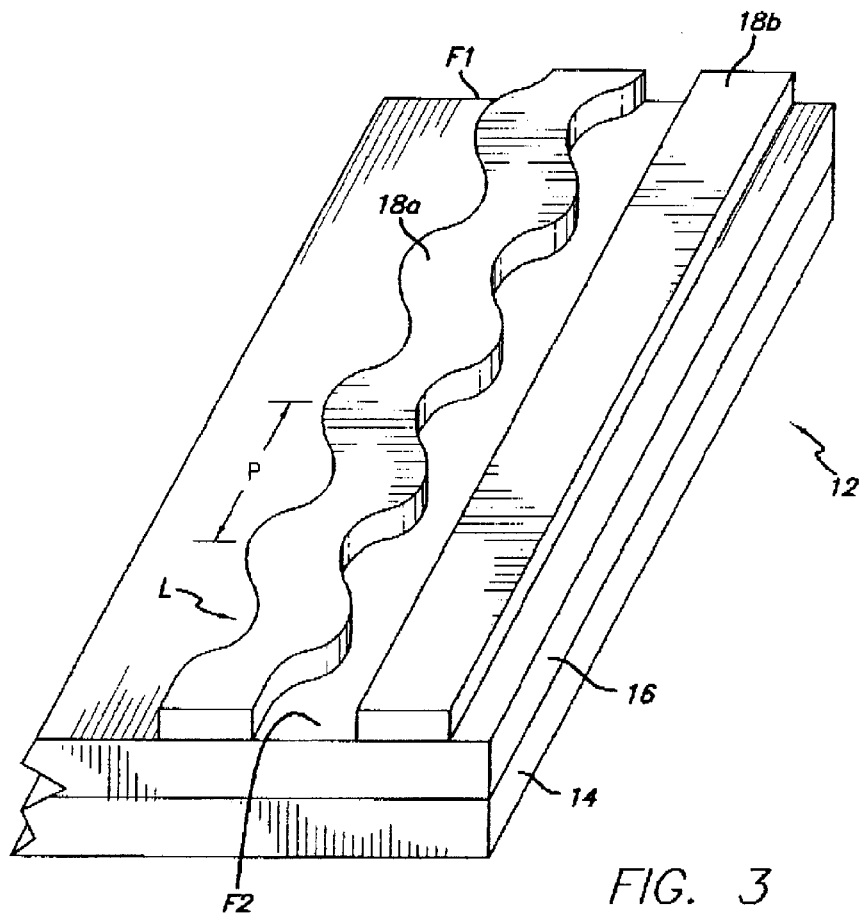
FIG. 3 is a fragmentary plan view of a wireless flexure embodiment of the invention.

Thus, in FIG. 3 trace flexure 12 includes paired trace members 18a, 18b that extend together over a predetermined distance D between two fixed points F1, F2. To counteract at a given locus L any unwanted local variation in the impedances of the respective paired members 18a, 18b, paired member 18a is reversely turned within the given locus. This increases its effective length relative to the other paired member 18b in capacitance-increasing relation sufficiently to make uniform the impedance of the conductive trace 18a with the other conductive trace 18b. In this manner the paired members 18a, 18b are kept at a uniform impedance within the locus L.

Preferably the one paired member 18a is made sinuous within the locus L and has a predetermined period "p" from peak to peak that is smaller than the frequency of the signals carried by the one paired member, e.g., the signal frequency is about 1 GHz, and the paired member period is less than about 1 inch, and preferably about 0.020 inch.

Figure 4:
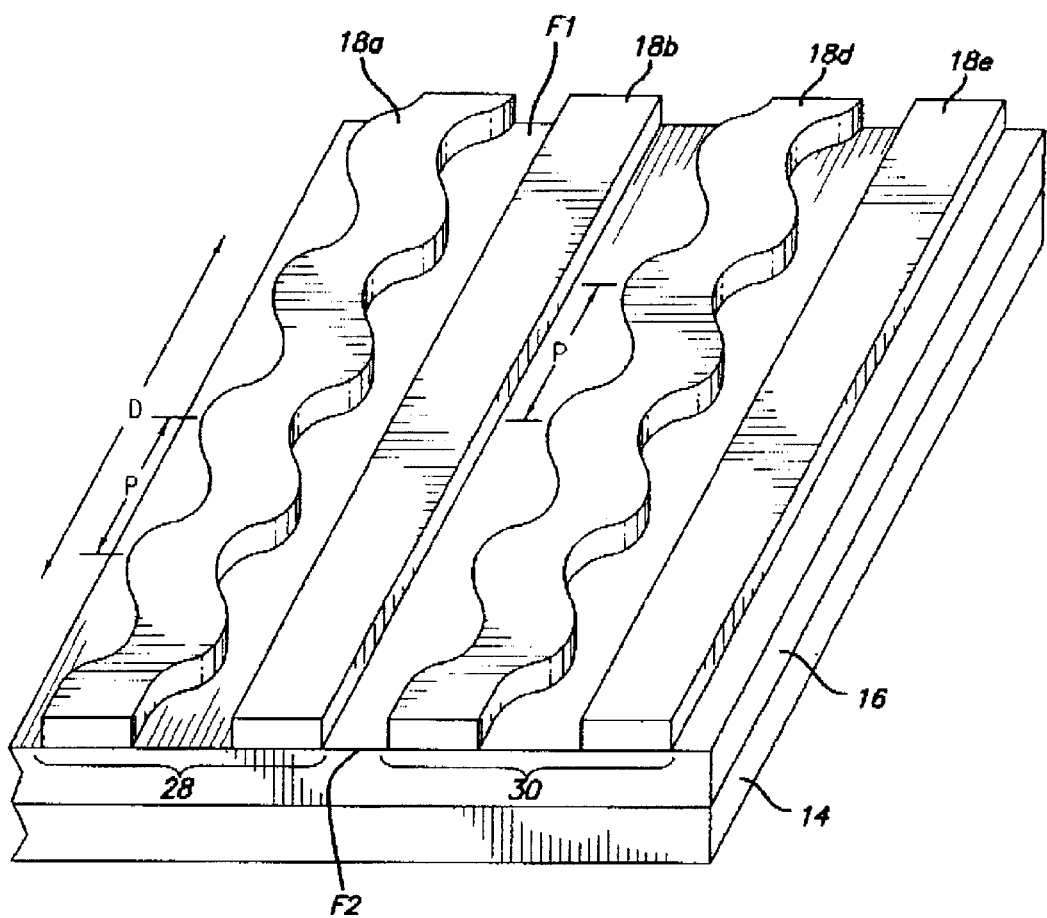
FIG. 4 is a view like FIG. 3 of a further embodiment of the invention.

With reference to FIG. 4, two pairs of conductive traces 28, 30 comprising paired respectively trace members 18a, 18b and 18d and 18e, extend together over a predetermined distance D between two fixed points F1 and F2. To counter any unwanted variation between the total impedances of the paired members 18a, 18b, or 18d and 18e, one of the paired trace members 18a, 18d in each pair 28, 30 is reversely as above described within the predetermined distance D to increase its effective length relative to the other paired member 18b and 18e in capacitance-increasing relation sufficiently to make uniform the impedance of the one conductive trace with the other conductive trace, and the paired traces are kept at a uniform impedance. The period p is kept within the values mentioned above.

Figure 5:
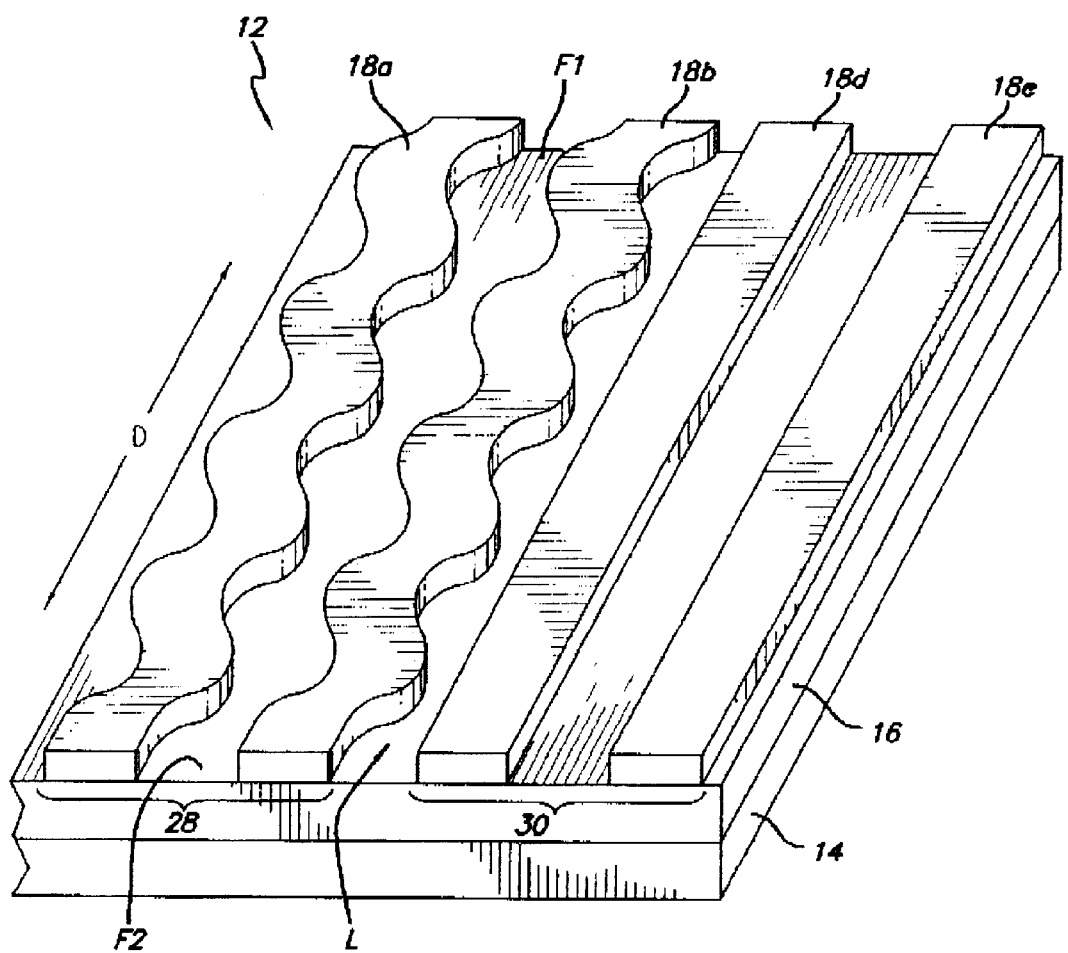
FIG. 5 is a view like FIG. 3 of a further embodiment of the invention.

With reference to FIG. 5, two or more pairs 28, 30 of conductive traces 18a, 18b, 18d and 18e extend together over a predetermined distance D between two fixed points F1 and F2. In this embodiment, both traces of pair 28 of conductive trace members is reversely turned within the predetermined distance D to increase its effective length relative to the other pair 30 in capacitance-increasing relation relative to the other pair, whereby the one pair 30 has the relatively higher impedance desired in a write circuit, e.g. 110 ohms, and the other pair 28 has the relatively lower impedance desired in a read circuit, e.g., 60 ohms.

Figure 6:
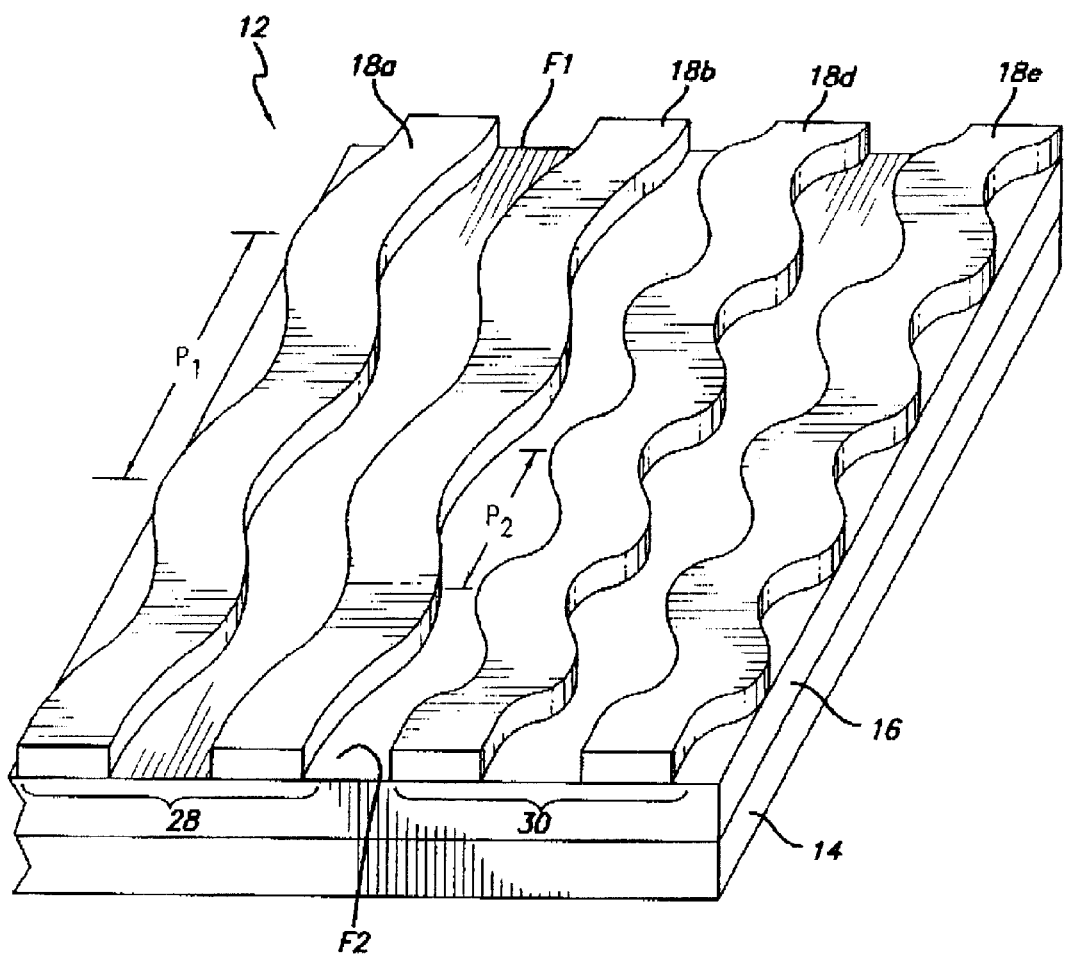
FIG. 6 is a view like FIG. 3 of a further embodiment of the invention.

With reference to FIG. 6, both pairs 28, 30 can be sinuously shaped as shown, and of different periods p1, p2 to be of different effective lengths in their traces 18a, 18b and 18d, 18e between fixed points F1, F2, to also achieve a desired difference in capacitance and impedance thereby.

Figure 7:
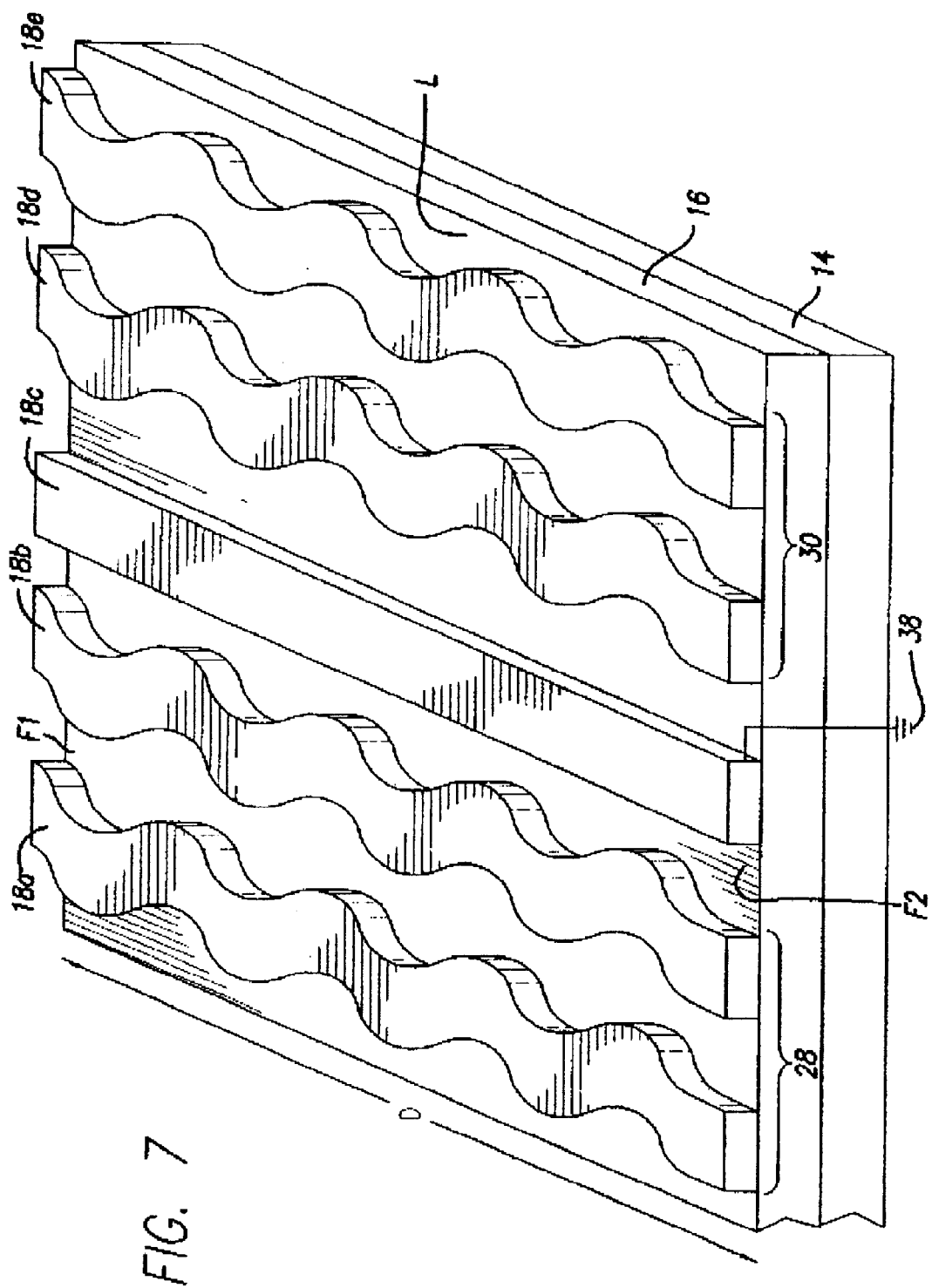
FIG. 7 is a view like FIG. 3 of a further embodiment of the invention.

With reference to FIG. 7, there can be provided in various of the invention embodiments, a further conductive trace 18c disposed between the pairs 28 and 30 of conductive traces 18a, 18b, 18d and 18e. Further conductive trace 18c is connected to electrical ground 38, whereby one pair 28 is better electrically isolated from the other pair 30.

The invention method of controlling impedance in a conductive trace flexure 12 comprising a laminate of a metal layer 14, an insulative film layer 16 and one or more pairs of conductive traces 28, 30 that are differentially routed over their lengths, including varying the width, spacing, and/or effective length of one of the conductive traces relative to the other conductive trace until the desired impedance is achieved, and preferably by making the higher impedance trace sinuous over at least a portion of its length to increase its effective length and its impedance thereby.

The invention thus provides greater control of impedance values in a disk drive suspension flexure, and more particularly a wireless flexure for a disk drive suspension having a constant characteristic impedance $Z_0$ over the length of the flexure traces regardless of the presence of mechanical obstacles, curves in layout, or other factors that have caused unwanted variations in impedance along and between conductive traces and trace pairs in the flexures. In the invention the conductive traces are customized along their length to meet situations that might limit the constancy of the impedance of the trace as by varying locally the width and spacing of conductive traces to offset locally unwanted variations and lack of constancy in impedance imposed by the flexure design or application, or increasing the effective length of one or more traces to increase capacitance relative to one or more adjacent traces and thus limit inversely changes in impedance constancy and alternatively to engineer a desired value the impedance of the one relative to the other, e.g. to increase the impedance of a write line over that of an adjacent read line.

The foregoing objects are thus met.

I claim:

1. Controlled impedance trace flexure for a disk drive suspension, the trace flexure comprising a laminate of a metal layer, an insulative film layer and one or more pairs of conductive traces comprising paired trace members that extend together differentially in a pattern between two fixed points such that there tend to be unwanted local variations in the respective impedances of said paired members over their extent and therefore a lack of constancy in conductive trace impedances, said paired members being locally modified in their relative spacing, length and/or width in capacitance varying relation sufficiently to offset said impedance variations, whereby said paired members are controlled to a constant impedance.

2. The controlled impedance trace flexure according to claim 1, in which paired members at a predetermined locus tend to unwanted variations in their respective impedances, said paired members being locally differentiated in width at said predetermined locus to locally vary their capacitance against said impedance variations.

3. The controlled impedance trace flexure according to claim 1, in which said paired members at a predetermined locus tend to unwanted variations in their respective impedances, said paired members being locally differently spaced at said predetermined locus to locally vary their capacitance against said impedance variations.

4. The controlled impedance trace flexure according to claim 1, in which said paired members at a predetermined locus tend to unwanted variations in their respective impedances, said paired members being locally of different lengths within said predetermined focus to locally vary their capacitance against said impedance variations.

5. Controlled impedance trace flexure for a disk drive suspension, said trace flexure comprising a laminate of a metal layer, an insulative film layer and one or more pairs of conductive traces comprising paired trace members that extend together over a predetermined distance between two fixed points and in which there tends to be at a given locus an unwanted local variation in the impedances of the respective paired members, one of said paired members being reversely turned within said given locus to increase its effective length relative to the other paired member in capacitance-increasing relation sufficiently to make uniform the impedance of said one conductive trace with said other conductive trace, whereby said paired members are kept at a uniform impedance within said locus.

6. The controlled impedance trace flexure according to claim 5, in which said one paired member is sinuous within said locus and has a predetermined period from peak to peak, said predetermined period being smaller than the frequency of the signals carried by said one paired member.

7. The controlled impedance trace flexure according to claim 6, in which said signal frequency is about 1 GHz, and said paired member period is less than about 1 inch.

8. Controlled impedance trace flexure for a disk drive suspension, said trace flexure comprising a laminate of a metal layer, an insulative film layer and one or more pairs of conductive traces comprising paired trace members that extend together over a predetermined distance between two fixed points and in which there tends to be an unwanted variation between the total impedances of the respective paired members, one of said paired members being reversely turned within said predetermined distance to increase its effective length relative to the other paired member in capacitance-increasing relation sufficiently to make uniform the impedance of said one conductive trace with said other conductive trace, whereby said paired members are kept at a uniform impedance.

9. The controlled trace flexure according to claim 8, in which said one paired member is sinuous and has a predetermined period from peak to peak, said predetermined period being smaller than the frequency of the signals carried by said one paired member.

10. The controlled impedance trace flexure according to claim 9, in which said signal frequency is about 1 GHz, and said paired member period is less than about 1 inch.

11. A method of controlling impedance in a conductive trace flexure comprising a laminate of a metal layer, an insulative film layer and one or more pairs of conductive traces that are differentially routed over their lengths, including varying the width, spacing, and or effective length of one of said conductive traces relative to the other conductive trace until the desired impedance is achieved.

12. A method of controlling impedance in a conductive trace flexure comprising a laminate of a metal layer, an insulative film layer and pairs of generally parallel, spaced conductive traces that are to have different impedances over their lengths, including making the higher impedance trace sinuous over at least a portion of its length to increase its effective length and its impedance thereby.

* * * * *